United States Patent
Hu et al.

(10) Patent No.: US 12,331,196 B2
(45) Date of Patent: Jun. 17, 2025

(54) AQUEOUS DISPERSION OF POLYMERIC PARTICLES

(71) Applicants: Dow Global Technologies LLC, Midland, MI (US); Rohm and Haas Company, Collegeville, PA (US)

(72) Inventors: Yuehan Hu, Shanghai (CN); Yan Li, Shanghai (CN); Zhi Juan Gong, Shanghai (CN); James C. Bohling, Lansdale, PA (US); Ling Li, Louyang (CN)

(73) Assignees: ROHM AND HAAS COMPANY, Collegeville, PA (US); DOW GLOBAL TECHNOLOGIES LLC, Midland, MI (US)

( * ) Notice: Subject to any disclaimer, the term of this patent is extended or adjusted under 35 U.S.C. 154(b) by 606 days.

(21) Appl. No.: 17/630,942

(22) PCT Filed: Sep. 9, 2019

(86) PCT No.: PCT/CN2019/104870
§ 371 (c)(1),
(2) Date: Jan. 28, 2022

(87) PCT Pub. No.: WO2021/046673
PCT Pub. Date: Mar. 18, 2021

(65) Prior Publication Data
US 2022/0275208 A1    Sep. 1, 2022

(51) Int. Cl.
*C08L 83/10* (2006.01)
*C09D 183/04* (2006.01)

(52) U.S. Cl.
CPC ............ *C08L 83/10* (2013.01); *C09D 183/04* (2013.01)

(58) Field of Classification Search
CPC .................. C08F 212/08; C08F 220/06; C08F 220/1804; C08F 230/02; C08F 283/122; C08G 77/16; C08L 83/04; C08L 83/10; C08L 83/12; C08L 83/14; C08L 83/16; C09D 143/02; C09D 183/04
See application file for complete search history.

(56) References Cited

U.S. PATENT DOCUMENTS

| | | |
|---|---|---|
| 5,633,332 A | 5/1997 | Land |
| 2007/0082478 A1 | 4/2007 | Lind |
| 2011/0150818 A1 | 6/2011 | Canfield |
| 2013/0012653 A1 | 1/2013 | Liu |

FOREIGN PATENT DOCUMENTS

| | | |
|---|---|---|
| CN | 1886460 B | 9/2010 |
| CN | 102197058 | 9/2011 |
| CN | 102947370 B | 5/2016 |
| CN | 106995510 A | 8/2017 |
| WO | 2018016985 A1 | 1/2018 |
| WO | 2019056361 A1 | 3/2019 |

OTHER PUBLICATIONS

Supplementary European Search Report for the corresponding European Application No. 19945360; Date of Mailing: May 4, 2023; 7 pages.

*Primary Examiner* — Ana L. Woodward
(74) *Attorney, Agent, or Firm* — CANTOR COLBURN LLP

(57) ABSTRACT

An aqueous dispersion of polymeric particles comprising a specific emulsion polymer and a hydroxyl-terminated polysiloxane, and an aqueous coating composition comprising the aqueous dispersion providing coatings made therefrom with improved water resistance, anti-corrosion, and water repellency properties.

20 Claims, No Drawings

AQUEOUS DISPERSION OF POLYMERIC PARTICLES

FIELD OF THE INVENTION

The present invention relates to an aqueous dispersion of polymeric particles and an aqueous coating composition comprising the same.

INTRODUCTION

Solvent borne coating compositions comprising epoxy resins, polyurethane, or alkyd resins are widely used in metal protective coatings due to their anti-corrosion performance, mechanical properties and appearance. Aqueous or waterborne coating compositions are becoming increasingly more important than solvent-based coating compositions for less environmental problems. For some coating applications, such as general industrial finishes and agriculture construction equipment coatings, it typically requires coatings with good anti-corrosion performance to sustain at least 240 hours salt-spray testing at a dry film thickness of about 45~55 μm or even lower. Moreover, waterborne coatings in many applications are desired to have sufficient water resistance and water repellency properties to meet industry requirements.

Therefore, there remains a need to provide an aqueous dispersion which provides the above described anti-corrosion as well as other desirable properties.

SUMMARY OF THE INVENTION

The present invention provides a novel stable aqueous dispersion of polymeric particles prepared by incorporation of a hydroxyl-terminated polysiloxane in the process of polymerization of a specific emulsion polymer. An aqueous coating composition comprising such aqueous dispersion can provide coatings made therefrom with improved corrosion resistance, improved water resistance, and/or better water repellency, as compared to the same coating compositions except the aqueous dispersion is free of any one of or both the hydroxyl-terminated polysiloxane and the specific emulsion polymer.

In a first aspect, the present invention is an aqueous dispersion of polymeric particles comprising an emulsion polymer and a hydroxyl-terminated polysiloxane,
  wherein the emulsion polymer comprises, by weight based on the weight of the emulsion polymer, more than 0.5% to 1.8% of structural units of an ethylenically unsaturated phosphorous acid monomer, a salt thereof, or mixtures thereof; and
  from zero to 5.0% of structural units of an ethylenically unsaturated functional monomer carrying at least one functional group selected from an amide, carboxyl, carboxylic anhydride, sulfonic acid, sulfonate, sulfuric acid, or sulfate group;
  wherein the hydroxyl-terminated polysiloxane with the polymeric particles is present in an amount of from 0.1% to 10%, by weight based on the weight of the emulsion polymer.

In a second aspect, the present invention is a process of preparing the aqueous dispersion of polymeric particles of the first aspect. The process may comprise:
  polymerization of monomers in an aqueous medium in the presence of a hydroxyl-terminated polysiloxane to obtain the aqueous dispersion of polymeric particles, wherein the monomers comprise, by weight based on the total weight of the monomers,
  more than 0.5% to 1.8% of an ethylenically unsaturated phosphorous acid monomer, a salt thereof, or mixtures thereof; and from zero to 5.0% of an ethylenically unsaturated functional monomer carrying at least one functional group selected from an amide, carboxyl, carboxylic anhydride, sulfonic acid, sulfonate, sulfuric acid, or sulfate group; and
  wherein the hydroxyl-terminated polysiloxane with the polymeric particles is present in an amount of from 0.1% to 10%, by weight based on the weight of the emulsion polymer.

In a third aspect, the present invention is an aqueous coating composition comprising the aqueous dispersion of polymeric particles of the first aspect.

DETAILED DESCRIPTION OF THE INVENTION

"Acrylic" in the present invention includes (meth)acrylic acid, alkyl (meth)acrylate, (meth)acrylamide, (meth)acrylonitrile and their modified forms such as hydroxyalkyl (meth)acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Aqueous dispersion" in the present invention means polymeric particles dispersed in an aqueous medium. "Aqueous medium" in the present invention means water and from 0 to 30%, by weight based on the weight of the medium, of water-miscible compound(s) such as, for example, alcohols, glycols, glycol ethers, glycol esters, and the like.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

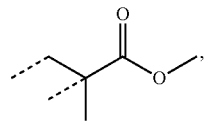

where the dotted lines represent the points of attachment of the structural unit to the polymer backbone.

The aqueous dispersion of polymeric particles comprising an emulsion polymer and a hydroxyl-terminated polysiloxane may be prepared by polymerization, e.g., emulsion polymerization, of monomers in an aqueous medium in the presence of one or more hydroxyl-terminated polysiloxanes.

The emulsion polymer useful in the present invention may comprise structural units of one or more ethylenically unsaturated phosphorous acid monomers, salts thereof, or mixtures thereof. The ethylenically unsaturated phosphorous acid monomers can be dihydrogen phosphate esters of an alcohol in which the alcohol contains or is substituted with a polymerizable vinyl or olefinic group. The ethylenically unsaturated phosphorous acid monomers and salts thereof may include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R)-C(O)-O-(R_pO)_n-P(O)(OH)_2$, wherein R=H or CH$_3$, R$_p$=alkylene and n=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred ethylenically unsaturated phosphorus acid monomers and salts thereof are selected from the group consisting of phosphoethyl (meth)acrylate, phosphopropyl (meth)acrylate, phosphobutyl (meth)acrylate, and salts thereof; more preferably, phosphoethyl methacrylate (PEM). The emulsion polymer may comprise, by weight based on the weight of the emulsion polymer, more than 0.5% of structural units of the ethylenically unsaturated phosphorous acid monomer and/or salts thereof, for example, 0.55% or more, 0.6% or more, 0.65% or more, 0.7% or more, 0.75% or more, 0.8% or more, 0.85 or more, 0.90% or more, 0.95% or more, or even 1.0% or more, and at the same time, 1.8% or less, 1.75% or less, 1.7% or less, 1.65% or less, 1.6% or less, 1.55% or less, 1.50% or less, 1.45% or less, or even 1.40% or less. Weight of the emulsion polymer herein in the present invention refers to the dry weight or solids weight of the emulsion polymer.

The emulsion polymer useful in the present invention may comprise structural units of one or more ethylenically unsaturated functional monomers carrying at least one functional group selected from an amide, carboxyl, carboxylic anhydride, sulfonic acid, sulfonate, sulfuric acid, or sulfate group. Suitable ethylenically unsaturated functional monomers may include, for example, α, β-ethylenically unsaturated carboxylic acids or anhydrides thereof such as (meth) acrylic acid, fumaric acid, (meth)acrylic anhydride, maleic anhydride, or mixtures thereof; sodium styrene sulfonate (SSS), sodium vinyl sulfonate (SVS), 2-acrylamido-2-methylpropanesulfonic acid (AMPS) and salts of AMPS, methacrylamide, acrylamide, or mixtures thereof. Preferred ethylenically unsaturated functional monomers include acrylic acid, methyl acrylic acid, sodium styrene sulfonate, or mixtures thereof. The emulsion polymer may comprise, by weight based on the weight of the emulsion polymer, zero or more, 0.1% or more, 0.2% or more, 0.3% or more, 0.4% or more, or even 0.5% or more, and at the same time, 5.0% or less, 4.5% or less, 4.0% or less, 3.5% or less, 3.0% or less, 2.5% or less, 2.0% or less, 1.5% or less, 1.2% or less, or even 1.0% or less of structural units of the ethylenically unsaturated monomer carrying at least one functional group.

The emulsion polymer useful in the present invention may comprise structural units of one or more monoethylenically unsaturated nonionic monomers that are different from the monomers described above. "Nonionic monomers" herein refers to monomers that do not bear an ionic charge between pH=1-14. The monoethylenically unsaturated nonionic monomers may include alkyl esters of (methyl) acrylic acids with an alkyl having from 1 to 20 carbon atoms, from 1 to 10 carbon atoms, or from 1 to 8 carbon atoms. Examples of suitable monoethylenically unsaturated nonionic monomers include methyl acrylate, methyl methacrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, or combinations thereof; (meth)acrylonitrile; ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); vinyl aromatic monomers including styrene and substituted styrene such as .alpha.-methyl styrene, p-methyl styrene, t-butyl styrene, vinyltoluene, or mixtures thereof; butadiene; α-olefins such as ethylene, propylene, and 1-decene; vinyl acetate, vinyl butyrate, vinyl versatate and other vinyl esters; glycidyl (meth)acrylate; or combinations thereof. Preferred monoethylenically unsaturated nonionic monomers are selected from the group consisting of methyl methacrylate, ethyl acrylate, butyl acrylate, 2-ethylhexyl acrylate, styrene, or mixtures thereof. The emulsion polymer may comprise, by weight based on the weight of the emulsion polymer, 88% or more, 89% or more, 90% or more, 91% or more, or even 92% or more, and at the same time, 99.5% or less, 99% or less, 98.5% or less, or even 98% or less of structural units of the monoethylenically unsaturated nonionic monomers.

The emulsion polymer useful in the present invention may further comprise structural units of one or more multiethylenically unsaturated monomers. Suitable multiethylenically unsaturated monomers may include alkylene glycol diacrylates and dimethacrylates such as, for example, ethylene glycol di(meth)acrylate, butylene glycol di(meth)acrylate, 1,1,1-trimethylol propane di(meth)acrylate, or pentaerythritol trimethacrylate; divinyl benzene, vinyl (meth)acrylate; allyl(meth)acrylate, N, N-methylene bisacrylamide, and the like; or mixtures thereof. The emulsion polymer may comprise, by weight based on the weight of the emulsion polymer, zero or more, 0.01% or more, 0.05% or more, or even 0.1% or more, and at the same time, 5% or less, 3% or less, or even 1% or less of structural units of the multiethylenically unsaturated monomer.

Total weight concentration of the structural units described above in the emulsion polymer may be equal to 100%. Types and levels of the monomers described above may be chosen to provide the obtained emulsion polymer with a glass transition temperature (Tg) suitable for different applications. The emulsion polymer may have a measured Tg in the range of −20° C. or more, −15° C. or more, −10° C. or more, −5° C. or more, 0° C. or more, or even 5° C. or more, and at the same time, 80° C. or less, 70° C. or less, 60° C. or less, 50° C. or less, 40° C. or less, or even 30° C. or less. By "measured Tg" as used herein, is meant the glass transition temperature as determined by differential scanning calorimetry (DSC) according to the test method described in the Examples section below.

The polymeric particles in the aqueous dispersion also comprise one or more hydroxyl-terminated polysiloxanes. "Hydroxyl-terminated polysiloxane" herein refers to a polysiloxane with two hydroxyl end groups. The hydroxyl-terminated polysiloxane useful in the present invention may have the structure represented by formula (I),

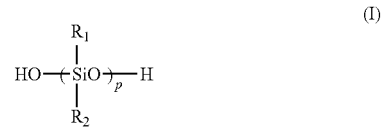

where p is an integer of from 2 to 100,000, and R$_1$ and R$_2$ may be the same or different and are independently selected from the group consisting of a substituted or unsubstituted alkyl group having one to 18 carbon atoms, a substituted or unsubstituted alkenyl group having 2 to 14 carbon atoms, a substituted or unsubstituted aryl group having 5 to 14 carbon atoms, a fluorine substituted alkyl group having one to 14 carbon atoms, and a substituted or unsubstituted aralkyl group having 6 to 24 carbon atoms. The value "p" can be 2 or higher, 3 or higher, 4 or higher, 5 or higher, 10 or higher, 15 or higher, or even 20 or higher, and at the same time, 100,000 or less, 1,000 or less, 400 or less, 120 or less, 100 or less, 75 or less, or even 50 or less. The $R_1$ or $R_2$ groups can be, for example, methyl, ethyl, n-propyl, isopropyl, n-butyl, sec-butyl, dodecyl, vinyl, allyl, phenyl, naphthyl, tolyl, 3,3,3-trifluoropropyl, benzyl, or phenylethyl. Preferably, $R_1$ and $R_2$ are independently methyl, ethyl, propyl or phenyl. $R_1$ and $R_2$ can be the same. Preferably, $R_1$ and $R_2$ are independently methyl or ethyl. More preferably, $R_1$ and $R_2$ are both methyl. Suitable examples of hydroxyl-terminated polysiloxane include, for example, hydroxyl-terminated polydimethylsiloxanes.

The hydroxyl-terminated polysiloxane useful in the present invention may have a weight average molecular weight of 400 grams per mole (g/mol) or more, 600 g/mol or more, 800 g/mol or more, or even 1,000 g/mol or more, at the same time, 1,000,000 g/mol or less, 500,000 g/mol or less, 100,000 g/mol or less, 80,000 g/mol or less, 60,000 g/mol or less, 50,000 g/mol or less, 40,000 g/mol or less, 30,000 g/mol or less, 20,000 g/mol or less, 10,000 g/mol or less, 8,000 g/mol or less, 7,000 g/mol or less, or even 6,000 g/mol or less. Weight average molecular weight may be determined by Gel Permeation Chromatography (GPC) as described in the Examples section below.

The hydroxyl-terminated polysiloxane with the polymeric particles may be present in an amount of 0.1% or more, 0.2% or more, 0.3% or more, 0.4% or more, 0.5% or more, 0.6% or more, 0.7% or more, 0.8% or more, 0.9% or more, 1.0% or more, 1.2% or more, 1.5% or more, 1.8% or more, 2.0% or more, 2.2% or more, or even 2.5% or more, and at the same time, 10.0% or less, 9.5% or less, 9.0% or less, 8.5% or less, 8.0% or less, 7.5% or less, 7.0% or less, 6.5% or less, 6.0% or less, 5.5% or less, or even 5% or less, by weight based on the weight of the emulsion polymer. "Hydroxyl-terminated polysiloxane with the polymeric particles" herein refers to the hydroxyl-terminated polysiloxane attached to the surface of the polymeric particles (i.e., on the polymeric particles) or embedded in the polymeric particles. The content of the hydroxyl-terminated polysiloxane with the polymeric particles may be determined by $^1$H NMR Analysis as described in the Examples section below.

The polymeric particles in the aqueous dispersion may have a particle size in the range of from 50 to 500 nanometers (nm), from 80 to 300 nm, or from 100 to 200 nm. The particle size herein refers to Z-average size and may be measured by a Brookhaven BI-90 Plus Particle Size Analyzer.

The aqueous dispersion of polymeric particles of the present invention may be prepared by polymerization, preferably emulsion polymerization, of the monomers described above, in an aqueous medium in the presence of the hydroxyl-terminated polysiloxane. The monomers useful for preparing the emulsion polymer may include the ethylenically unsaturated phosphorous acid monomer, the salt thereof, or mixtures thereof; the monoethylenically unsaturated nonionic monomer; and optionally, the ethylenically unsaturated functional monomer; and the multiethylenically unsaturated monomer. In some embodiments, the monomers comprise the monoethylenically unsaturated nonionic monomer, more than 0.5% to 1.8% of the ethylenically unsaturated phosphorous acid monomer, the salt thereof, or mixtures thereof, and from zero to 5.0% structural units of the ethylenically unsaturated functional monomer, by weight based on the total weight of the monomers. The monomers for preparing the emulsion polymer may be added neat or as an emulsion in water; or added in one or more additions or continuously, linearly or nonlinearly, over the reaction period of preparing the polymeric particles. Total weight concentration of the monomers for preparing the emulsion polymer may be equal to 100%. The content of each monomer based on the total weight of the monomers can be the same as the content of such monomer as structural units in the emulsion polymer described above, by weight based on the weight of the emulsion polymer, for example, the monomers comprise, by weight based on the total weight of the monomers, more than 0.5% to 1.8%, preferably from 0.6% to 1.6% of the ethylenically unsaturated phosphorous acid monomer, the salt thereof, or mixtures thereof. The hydroxyl-terminated polysiloxane, preferably in an amount of from 0.1% to 10%, by weight based on the total weight of the monomers (i.e., the weight of the emulsion polymer), may be added prior to or during the polymerization of the monomers, or combinations thereof. The hydroxyl-terminated polysiloxane may be added into the monomers, or added into a polymer seed (for example, a polystyrene seed) to be shot into a reactor, or dispersed in the monomers. In one embodiment, the hydroxyl-terminated polysiloxane is mixed with the monomers prior to polymerization of the monomers. The polymeric particles formed after emulsion polymerization are typically emulsion polymer/hydroxyl-terminated polysiloxane hybrid particles. Without being bound by a theory, after polymerization process, all or the major part of the hydroxyl-terminated polysiloxanes are with the polymeric particles (i.e., in or on the polymeric particles), which means the aqueous medium of the aqueous dispersion of the present invention comprises a substantial absence of the hydroxyl-terminated polysiloxane. As used herein, a substantial absence of the hydroxyl-terminated polysiloxane means less than 5%, less than 3%, less than 2%, less than 1%, or zero of total weight of the hydroxyl-terminated polysiloxane in the aqueous dispersion (i.e., total weight of the hydroxyl-terminated polysiloxane with the polymeric particles and in the aqueous medium of the aqueous dispersion). The content of the hydroxyl-terminated polysiloxane in the aqueous medium of the aqueous dispersion may be determined by extracting the aqueous dispersion through hexane according to $^1$H NMR Analysis as described in the Examples section below.

Temperature suitable for polymerization of the monomers may be lower than 100° C., in the range of from 30 to 95° C., or in the range of from 50 to 92° C. Multistage emulsion polymerization using the monomers described above can be used, which at least two stages are formed sequentially, and usually results in the formation of the multistage polymer comprising at least two polymer compositions.

Free radical initiators may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of the monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

One or more surfactants may be used in the polymerization process. The surfactant may be added prior to or during the polymerization of the monomers, or combinations thereof. A portion of the surfactant can also be added after the polymerization. These surfactants may include anionic and/or nonionic emulsifiers. The surfactants can be reactive surfactants, e.g., polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The surfactant used is usually from zero to 10%, from 0.5% to 3%, or from 0.8% to 1.5%, by weight based on the total weight of the monomers.

One or more chain transfer agents may be used in the polymerization process. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer. The chain transfer agent may be used in an amount of from zero to 5%, from 0.05% to 1%, or from 0.1% to 0.3%, by weight based on the total weight of the monomers.

After completing the polymerization process, the obtained aqueous dispersion may be neutralized by one or more bases to a pH value, for example, at least 7, from 7 to 10, or from 8 to 9. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. The aqueous dispersion of the present invention may have a solids content of from 20% to 70% by weight or from 40% to 60% by weight.

The aqueous dispersion of the present invention is a stable aqueous dispersion, as indicated by no phase separation or visible oil-like droplets floating on the surface after storage at room temperature (23±2° C.) for 1 month or longer, 2 months or longer, or even 6 months or longer. The aqueous dispersion of polymeric particles of the present invention is useful for use in many applications, for examples, coatings, adhesives, and inks.

The present invention also relates to an aqueous coating composition comprising the aqueous dispersion of polymeric particles. The aqueous dispersion of polymeric particles may be present, by weight based on the total weight of the aqueous coating composition, in an amount of from 10% to 80%, from 20% to 70%, or from 30% to 60%.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form. The aqueous coating composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 10% to 60%, from 12% to 55%, from 15% to 50%, or from 17% to 45%. PVC of a coating composition may be determined according to the following equation: PVC=[Volume$_{(Pigment+Extender)}$/Volume$_{(Pigment+Extender+Binder)}$] 100%

The aqueous coating composition of the present invention may comprise one or more coalescents. "Coalescent" herein means a compound that is able to aid dispersed polymer particles to form a homogeneous coating film by reducing the film formation temperature of the polymer. The coalescent typically has a molecular weight less than 410. Examples of suitable coalescents include ethylene glycol ethyl ether, ethylene glycol propyle ether, ethylene glycol butyl ether, ethylene glycol hexyl ether, diethylene glycol methyl ether, diethylene glycol ethyl ether, diethylene glycol butyl ether, diethylene glycol hexyl ether, propylene glycol n-butyl ether, dipropylene glycol n-butyl ether, dipropylene glycol methylene ether, tripropylene glycol methyl ether, propylene glycol phenyl ether, propylene glycol tert-butyl ether, 2,2,4-thimethyl-1,3-pentanediol monoisobutyrate, 2,2,4-trimethyl-1,3-pentanediol diisobutyrate, or mixtures thereof. Commercially available coalescents may include, for example, Texanol ester alcohol, OE-300, and OE-400 coalescents all from Eastman Chemical Company, COASOL coalescent from Chemoxy International, or mixtures thereof. The coalescent may be present in an amount of from zero to 10.0%, from 0.2% to 5.0%, from 0.4% to 3.0%, from 0.6% to 2.0%, or from 0.8% to 1.5%, by weight based on the total weight of the aqueous coating composition.

The aqueous coating composition of the present invention may comprise one or more matting agents. "Matting agents" herein refer to any inorganic or organic particles that provide matt effect. The matting agents may be selected from silica matting agents, diatomate, polyurea matting agents, polyacrylate, polyethylene, polytetrafluoroethene, or mixtures thereof. The matting agent may be present, by solids weight based on the total weight of the aqueous coating composition, in an amount of from zero to 10%, from 0.1% to 8%, or from 0.5% to 5%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, in an amount of from zero to 1.0%, from 0.05% to 0.8%, from 0.1% to 0.6%, or from 0.2% to 0.4%.

The aqueous coating composition of the present invention may further comprise one or more thickeners (also known as "rheology modifiers"). The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose. Preferred thickener is based on HEUR. The thickener may be present, by weight based on the total weight of the aqueous coating composition, in an amount of from zero to 5%, from 0.1% to 4%, from 0.2% to 4%, or from 0.3% to 3%.

The aqueous coating composition of the present invention may further comprise one or more dispersants. The dispersants may include non-ionic, anionic, or cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids (e.g., molecular weight ranging from 1,000 to 50,000 as measured by GPC), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present, by weight based on the total weight of the aqueous coating composition, in an amount of from zero to 10%, from 0.2% to 5.0%, or from 0.5% to 1.5%.

The aqueous coating composition of the present invention may further comprise water. The concentration of water may be, by weight based on the total weight of the aqueous coating composition, in amount of from 30% to 90%, from 35% to 80%, or from 40% to 70%.

In addition to the components described above, the aqueous coating composition of the present invention may further comprise any one or combination of the following additives: buffers, neutralizers, dispersants, humectants, mildewcides, biocides, anti-skinning agents, colorants, flowing agents, anti-oxidants, leveling agents, adhesion promoters, anti-scratch additives, anti-flash rust additives, anticorrosion additives, co-solvents, and grind vehicles. These additives may be present in a combined amount of from zero to 40%, from 0.5% to 30%, from 1.0% to 20%, from 2.0% to 10%, by weight based on the total weight of the aqueous coating composition.

The aqueous coating composition of the present invention may be prepared with techniques known in the coating art. The process of preparing the aqueous coating composition may comprise admixing the aqueous dispersion of polymeric particles with other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises pigments and/or extenders, the pigments and/or extenders are preferably mixed with the dispersant to form a slurry of pigments and/or extenders.

The present invention also provides a method of providing a coating on a corrosion susceptible substrate, such as metal, comprising: applying the substrate the aqueous coating composition, and drying, or allowing to dry, the aqueous coating composition to form the coating. The aqueous coating composition can provide the coating with improved corrosion resistance, for example, blister rating of 6M or better and surface rusted rating of 7P or better, for a coating with a thickness of 45~55 μm after exposure to salt spray for at least 240 hours. The aqueous coating composition may also provide the coating with improved water resistance, e.g. blister rating of 5 or higher, preferably 6 or higher, more preferably 7 or higher; and rust rating of 6 or higher. The aqueous coating composition may also provide the coating with good water repellency (also as "beading effect"), as indicated by a beading score of 3 or higher, or even 4 or higher. These properties are measured according to the test methods described in the Examples section below.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition, preferably comprising the pigment, is suitable for various applications such as marine protective coatings, general industrial finishes, metal protective coatings, automotive coatings, traffic paints, Exterior Insulation and Finish Systems (EIFS), wood coatings, coil coatings, plastic coatings, can coatings, architectural coatings, and civil engineering coatings. The aqueous coating composition is particularly suitable for metal protective coatings. The aqueous coating composition can be used as a primer, a topcoat, as one-coat direct-to-metal coating, or in combination with other coatings to form multi-layer coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the aqueous coating composition can dry, or allow to dry, to form a film (this is, coating) at room temperature, or at an elevated temperature, for example, from 25 to 80° C. to form a film (this is, coating).

EXAMPLES

Some embodiments of the invention will now be described in the following Examples, wherein all parts and percentages are by weight unless otherwise specified.

Styrene (ST), butyl acrylate (BA), and methacrylic acid (MAA) are all available from Shanghai Lang Yuan Chemical Co., Ltd.

Sodium p-styrene sulfonate (SSS) (90.5% active) is available from Shanghai Chemical Reagent Co., Ltd.

Phosphoethyl methacrylate (PEM) is available from Solvay.

PDMS-1, available from The Dow Chemical Company, is a hydroxyl group terminated polydimethylsiloxane with a weight average molecular weight of about 5,600 g/mol and hydroxyl group (OH) weight equivalent of 1.2%.

PDMS-2, available from The Dow Chemical Company, is a hydroxyl group terminated polydimethylsiloxane with a weight average molecular weight of about 1,800 g/mol and OH weight equivalent of 4.8%.

Disponil FES-32 surfactant (solids: 31%), available from Cognis, is sodium salt of fatty alcohol ether sulphate.

AMP-95 (solids: 95%), available from Angus Chemical Company, is 2-amino-2-methyl-1-propanol and used as a neutralizer.

TAMOL™ 681 dispersant (a hydrophobic copolymer pigment dispersant), OROTAN™ CA-2500 dispersant (a hydrophobic copolymer pigment dispersant), and ROPAQUE™ ULTRA E opaque polymer are all available from The Dow Chemical Company.

ACRYSOL™ RM-12W, ACRYSOL RM-8W, and ACRYSOL RM-2020 NPR rheology modifiers, available from The Dow Chemical Company, are non-ionic, hydrophobically modified ethylene oxide urethane (HEUR) rheology modifiers.

Tego Foamex 825 defoamer is available from Evonik Industry Co., Ltd.

Nopco NXZ defoamer is available from Japan Nopco.

Texanol coalescent is available from Eastman Chemical Company.

Ti-Pure R-706 titanium dioxide as a pigment is available from The Chemous Company.

CC-1500 calcium dioxide, available from Huangtian Chengxin Calcium Carbonate Powder Company, is used as an extender.

Natrosol 250 HBR water soluble hydroxyethylcellulose is available from Ashland Specialty Chemical Company.

TAMOL, ACRYSOL, and OROTAN are trademarks of The Dow Chemical Company.

The following standard analytical equipment and methods are used in the Examples.

Measured Glass Transition Temperature (Tg)

Tg was measured by DSC. A 5-10 milligram (mg) sample was analyzed in a sealed aluminum pan on a TA Instrument DSC Q2000 fitted with an auto-sampler under nitrogen ($N_2$) atmosphere. Tg measurement by DSC was with three cycles including, from −60 to 150° C., 10° C./min ($1^{st}$ cycle, then hold for 5 minutes to erase thermal history of the sample), from 150 to −60° C., 10° C./min ($2^{nd}$ cycle), and from −60 to 150° C., 10° C./min ($3^{rd}$ cycle). Tg was obtained from the $3^{rd}$ cycle by "half height" method.

$^1$H NMR Analysis

To 5 g of each aqueous dispersion to be tested was added 15 ml hexane. The resultant mixture was stirred overnight. Then the hexane phase was separated and dried under $N_2$ atmosphere. The dried residue of the hexane phase was sent for $^1$H NMR analysis. $^1$H NMR measurement was conducted to quantify the amount of polydimethylsiloxane (PDMS) in the extracted hexane phase (i.e., the amount of PDMS in the aqueous medium of the aqueous dispersion). Triphenyl phosphine (PPh3) was selected as the internal standard. A mixture of 50 mg of PPh3 and 51 mg of PDMS-1 was used as the standard sample for aqueous dispersions of Examples 6, 7, and 9. Chloroform-D1 was used as the solvent. The content of the hydroxyl-terminated polysiloxane with the polymeric particles, by weight based on the weight of the emulsion polymer, was reported. The extraction ratio of PDMS was also reported. The PDMS extraction ratio represents the content of PDMS present in the aqueous medium of an aqueous dispersion, by weight based on the total weight of PDMS in such aqueous dispersion (i.e., the total weight of PDMS with the polymeric particles and in the aqueous medium).

GPC Analysis

Molecular weights of a hydroxyl-terminated polysiloxane sample (e.g., PDMS-1 or PDMS-2) were measured by GPC analysis using an Agilent 1200. The sample was dissolved in 30 mL of tetrahydrofuran (THF)/formic acid (FA) (95:5 volume/volume) with a concentration of 2 mg/mL, stirred for over 1 hour and left overnight, and then filtered through 0.45 μm polytetrafluoroethylene (PTFE) filter prior to the GPC analysis. The GPC analysis was conducted using the following instrumental conditions:

Columns: One PLgel GUARD columns (10 μm, 50×7.5 mm) (132#), two Mixed B columns (7.8×300 mm) in tandem (114#,115#); column temperature: 40° C.; mobile phase: THF/FA (5%); flow rate: 1.0 mL/min; injection volume: 100 μL; detector: Agilent Refractive Index detector, 40° C.; and calibration curve: PL Polystyrene 1 Narrow standards with molecular weights ranging from 2329000 to 580 g/mol, using polynom 3 fitness.

Water Resistance

Coated panels were prepared by applying a test coating composition onto a steel sheet by an applicator to form two layers of coating films with wet film thickness of 120 μm for the first layer and 80 μm for the second layer. The resultant films were then allowed to dry at room temperature for 24 hours. The coated panels were dipped into water for 10 days before recording the degree of rust and blister. The surface of the panels was then rated for the degree of rust and blister, respectively, according to the rating criteria given in Table A below. For the water resistance testing, the acceptable blister rating is 5 or higher and the acceptable rust rating is 6 or higher.

TABLE A

| Blister/Rust rating criteria | |
|---|---|
| Surface Blister/Rusted Percentage | Rating |
| Less than or equal to 0.01 percent | 10 |
| Greater than 0.01 percent and up to 0.05 percent | 9 |
| Greater than 0.05 percent and up to 0.1 percent | 8 |
| Greater than 0.1 percent and up to 1.0 percent | 7 |
| Greater than 1.0 percent and up to 2.0 percent | 6 |
| Greater than 2.0 percent and up to 5.0 percent | 5 |
| Greater than 5.0 percent and up to 10.0 percent | 4 |
| Greater than 10.0 percent and up to 20.0 percent | 3 |
| Greater than 20.0 percent and up to 30.0 percent | 2 |
| Greater than 30.0 percent and up to 50.0 percent | 1 |
| Greater than 50.0 percent | 0 |

Salt Spray Resistance Test

Coated panels were prepared by applying a test coating composition onto a steel sheet by an applicator to form two layers of coating films with wet film thickness of 120 μm for the first layer and 80 μm for the second layer. The coated panels were then allowed to dry at room temperature for 7 days to obtain dry films with total thickness of around 50 μm. Salt spray resistance properties were tested by exposure of the as prepared coated panels to a salt spray environment (5% sodium chloride fog) in accordance with ASTM B117-2011. Exposed cold rolled steel was covered with tape (3M plastic tape #471) prior to exposure. A scribe mark made with a razor blade was scratched into the bottom half of the panels obtained above immediately before exposure. The panels were exposed to the salt spray environment for 240 hours, and then removed from the salt spray environment. The surface of the panels was then rated blister and rust. The results were presented as blister/rust ratings. Blister ratings were conducted in accordance with ASTM D714-02 (2010) and comprised a number and/or one or more letters, as shown in Table B. The letter F, M, MD or D is a qualitative representation of the density of blisters. The number refers to the size of the blister, whereby 2 is the largest size, 8 is the smallest size, and 10 is no blister. The bigger the number, the smaller the size of blister. Rust ratings are determined by ASTM D610-2001, as shown in Tables C and D. For the salt spray test for 240 hours, the acceptable blister rating is 6M or better and the acceptable rust rating is 7P or better.

TABLE B

Blister rating criteria

| Density of blister | Abbreviation | Size of Blister | Rating |
|---|---|---|---|
| Few | F | Very Big blister | 2 |
| Medium | M | Big blister | 4 |
| Medium dense | MD | Small to middle blister | 6 |
| Dense | D | Smallest blister seen by unaided eye | 8 |
| | | No blister | 10 |

TABLE C

Rust rating by rusting degree

| Rusting degree | Rating |
|---|---|
| Spots | S |
| General | G |
| Pin point | P |

TABLE D

Rust rating by surface rusted percentage

| Surface Rusted | Rating |
|---|---|
| Less than or equal to 0.01 percent | 10 |
| Greater than 0.01 percent and up to 0.03 percent | 9 |
| Greater than 0.03 percent and up to 0.1 percent | 8 |
| Greater than 0.1 percent and up to 0.3 percent | 7 |
| Greater than 0.3 percent and up to 1.0 percent | 6 |
| Greater than 1.0 percent and up to 3.0 percent | 5 |
| Greater than 3.0 percent and up to 10.0 percent | 4 |
| Greater than 10.0 percent and up to 16.0 percent | 3 |
| Greater than 16.0 percent and up to 33.0 percent | 2 |
| Greater than 33.0 percent and up to 50.0 percent | 1 |
| Greater than 50.0 percent | 0 |

Water Repellency

Water repellency (also as "beading effect") represents difficulty for water to wet the coating surface. A coating composition was casted on a Leneta black scrub test panel (P121-10N) by using a 100 μm film caster, starting from the secured end of the panel. The panel was then air dried horizontally at 25° C. for 7 days in a Constant Temperature Room (CTR). The obtained panel was kept vertical so that water drops were allowed to flow from the upper to the bottom side of the panel. Water repellency was visually observed and ranked by beading scores as shown in Table E below. The beading score of 3 or higher indicates good water repellency (i.e., good beading effect). Otherwise, if the beading score is less than 3 (<3), it indicates poor water repellency (i.e., no beading effect).

TABLE E

Ranking standard for water repellency

| Beading Score | Description |
|---|---|
| 5 | No wetting nor adhesion of water droplets observed on the coating surface |
| 4 | Wetting observed by individual small circular or elliptic water droplets observed on the coating surface |
| 3 | Wetting observed by individual large water droplets on the coating surface |
| 2 | Wetting observed along the discrete track of water on the coating surface |
| 1 | Wetting observed along the thinner track of water on the coating surface |
| 0 | Wetting observed along the entire track of water on the coating surface |

Example (Ex) 1

Firstly, a monomer emulsion was prepared by mixing deionized (DI) water (487.42 g), FES-32 surfactant (31%, 57.93 g), SSS (90.5%, 5.68 g), BA (964.02 g), ST (721.80 g), MAA (3.48 g), PEM (23.64 g), and PDMS-1 (85.5 g). Into a one-gallon vessel, equipped with a reflux condenser, addition funnels and stirrer. An initial water charge was added with agitation at 130 rpm. The reaction vessel was heated to 88° C. FES-32 surfactant (31%, 4.20 g) was added into the vessel. A portion of the monomer emulsion (110.74 g) and a solution of ammonia persulfate (APS) (6.18 g APS dissolved in 17.73 g DI water) were charged to the reaction vessel. The reaction mixture was held for 5 minutes for seed formation at 82-88° C. The remainder of the monomer emulsion was added over a period of 120 minutes with temperature between 85° C. and 87° C. After completing addition of the monomer mixture, a solution of APS (2.47 g APS dissolved in 67.18 g DI water) and a solution of sodium bisulfate (NaBS) (2.62 g NaBS (solids: 99.8%) dissolved in 66.28 g DI water), the contents of the reaction vessel were cooled to room temperature. During cooling, a mixture of 4.04 g of tert-Butyl hydroperoxide (t-BHP) (solids: 70%) in 28.65 g of DI water, and 2.08 g of isoascorbic acid (IAA) in 28.87 g of DI water were added when the temperature was at 65° C. When the vessel temperature reached 50° C. or below, AMP-95 (95%, 27.50 g) was added to adjust the pH of the obtained polymer dispersion over 7.

Ex 2

The aqueous dispersion of Ex 2 was prepared as in Ex 1 except that 85.5 g of PDMS-2 was used in the monomer emulsion instead of 85.5 g of PDMS-1.

Ex 3

The aqueous dispersion of Ex 3 was prepared as in Ex 1 except that the dosage of PDMS-1 in the monomer emulsion was 8.55 g.

Ex 4

The aqueous dispersion of Ex 4 was prepared as in Ex 1 except that the dosage of PDMS-1 in the monomer emulsion was 17.10 g.

Ex 5

The aqueous dispersion Ex 5 was prepared as in Ex 1 except that the dosage of PDMS-1 in the monomer emulsion was 42.75 g.

Ex 6

The aqueous dispersion Ex 6 was prepared as in Ex 1 except that the dosage of PDMS-1 in the monomer emulsion was 25.65 g. The obtained polymer dispersion was analyzed by $^1$H NMR Analysis as described above and the PDMS extraction ratio was 1.18%.

Ex 7

The aqueous dispersion Ex 7 was prepared as in Ex 1 except that the dosage of PDMS-1 in the monomer emulsion was 136.80 g. The obtained polymer dispersion was analyzed by $^1$H NMR Analysis as described above and the PDMS extraction ratio was 2.76%.

Ex 8

The aqueous dispersion Ex 8 was prepared as in Ex 1 except that the dosage of PDMS-1 in the monomer emulsion was 181.00 g.

Ex 9

The aqueous dispersion Ex 9 was prepared as in Ex 1 except that the dosages of PEM and ST in the monomer emulsion were 10.26 g and 735.13 g, respectively. The obtained polymer dispersion was analyzed by $^1$H NMR Analysis as described above and the PDMS extraction ratio was 1.74%.

Ex 10

The aqueous dispersion Ex 10 was prepared as in Ex 1 except that the dosages of PEM and ST in the monomer mixture were 27.71 g and 717.57 g, respectively.

Comparative (Comp) Ex 1

Firstly, a monomer mixture was prepared by mixing DI water (487.42 g), FES-32 surfactant (31%, 57.93 g), SSS (90.5%, 5.68 g), BA (964.02 g), ST (706.05 g), and MAA (42.88 g). Into a one-gallon vessel, equipped with a reflux condenser, addition funnels and stirrer. An initial water charge was added with agitation at 130 rpm. The reaction vessel was heated to 88° C. FES-32 surfactant (31%, 4.20 g) was added into the vessel. A portion of the monomer emulsion (110.74 g) and a solution of APS (6.18 g APS dissolved in 17.73 g DI water) were charged to the reaction vessel. The reaction mixture was held for 5 minutes for seed formation at 82-88° C. The remainder of the monomer emulsion was added over a period of 120 minutes with temperature between 85° C. and 87° C. After completing addition of the monomer emulsion, a solution of APS (2.47 g APS dissolved in 67.18 g DI water) and a solution of NaBS (2.62 g NaBS (solids: 99.8%) dissolved in 66.28 g DI water), the contents of the reaction vessel were cooled to room temperature. During cooling, a mixture of 4.04 g of t-BHP (solids: 70%) in 28.65 g of DI water, and 2.08 g of IAA in 28.87 g of DI water were added when the temperature was at 65° C. When the vessel temperature reached 50° C. or below, AMP-95 (95%, 27.50 g) was added to adjust the pH of the obtained polymer dispersion over 7.

Comp Ex 2

The aqueous dispersion of Comp Ex 2 was prepared as in Ex 1 except the monomer emulsion was prepared by mixing DI water (487.42 g), FES-32 surfactant (31%, 57.93 g), SSS (90.5%, 5.68 g), BA (964.02 g), ST (721.80 g), MAA (3.48 g), and PEM (23.64 g).

Comp Ex 3

The aqueous dispersion of Comp Ex 3 was prepared as in Comp Ex 1 except that the monomer emulsion was prepared by mixing DI water (487.42 g), FES-32 surfactant (31%, 57.93 g), SSS (90.5%, 5.68 g), BA (964.02 g), ST (706.05 g), MAA (42.88 g), and PDMS-1 (85.5 g).

Comp Ex 4

The aqueous dispersion of Comp Ex 4 was prepared as in Comp Ex 1 except that the monomer emulsion was prepared by mixing DI water (487.42 g), FES-32 surfactant (31%, 57.93 g), SSS (90.5%, 5.68 g), BA (964.02 g), ST (742.88 g), MAA (3.48 g), PEM (2.57 g), and PDMS-1 (85.5 g).

Comp Ex 5

The aqueous dispersion of Comp Ex 5 was prepared as in Comp Ex 1 except that the monomer emulsion was prepared by mixing DI water (487.42 g), FES-32 surfactant (31%, 57.93 g), SSS (90.5%, 5.68 g), BA (964.02 g), ST (715.84 g), PEM (32.84 g), and PDMS-1 (85.5 g).

Comp Ex 6

PDMS-1 (23.2 g) was added into 1,000 g of the aqueous dispersion of Comp Ex 1 at room temperature with stirring for 24 hours. Then appearance of the obtained blend was evaluated by visual inspection. Lots of oil-like droplets were observed floating on the surface, which indicates that cold blending is not an efficient way to make a homogenous and stable binder or paint system.

In contrast, all the aqueous dispersions of Exs 1-10 were homogeneous and stable, showing no phase separation or oil-like droplets observed floating on the surface, after storage at room temperature for 6 months or after heat aging at 50° C. for 10 days. It indicates that the aqueous dispersions of the present invention have better stability than Comp Ex 6.

Properties of the above obtained aqueous dispersions are shown in Tables 1 and 2. These dispersions were used as binders for preparing coating compositions.

TABLE 1

Physical properties of aqueous dispersions

| Aqueous dispersion | pH | Particle size[1], nm | Solids content[2], % | Viscosity[3], cP | Tg[4], °C. |
|---|---|---|---|---|---|
| Comp Ex 1 | 8.86 | 118 | 48.21 | 196 | 10.0 |
| Comp Ex 2 | 7.37 | 128 | 47.62 | 86 | 9.5 |
| Comp Ex 3 | 9.03 | 122 | 48.88 | 186 | 10.0 |
| Comp Ex 4 | 8.17 | 118 | 48.54 | 339 | 10.0 |
| Comp Ex 5 | 8.29 | 123 | 48.81 | 343 | 10.0 |
| Ex 1 | 7.21 | 125 | 49.18 | 149 | 10.0 |
| Ex 2 | 6.52 | 120 | 49.10 | 130 | 10.0 |
| Ex 3 | 7.27 | 125 | 48.1 | 131 | 10.0 |
| Ex 4 | 7.2 | 128 | 48.13 | 122 | 10.0 |
| Ex 5 | 7.18 | 124 | 48.61 | 142 | 10.0 |
| Ex 6 | 7.33 | 118 | 48.38 | 316 | 10.0 |
| Ex 7 | 7.57 | 121 | 49.71 | 125 | 10.0 |
| Ex 8 | 7.72 | 117 | 50.15 | 160 | 10.0 |
| Ex 9 | 8.15 | 115 | 48.47 | 335 | 10.0 |
| Ex 10 | 7.5 | 119 | 49.15 | 107 | 10.0 |

[1]Particle size was measured by a Brookhaven BI-90 Plus Particle Size Analyzer;
[2]Solids content was measured by weighting 0.7 ± 0.1 g of an aqueous dispersion sample (wet weight of the sample is denoted as "W1"), putting the sample into an aluminum pan (weight of aluminum pan is denoted as "W2") in an oven at 150° C. for 25 min, and then cooling and weighting the aluminum pan with the dried sample with total weight denoted as "W3". Solids content is calculated by (W3 − W2)/W1*100%;
[3]Viscosity in centipoise (cP) was measured by BROOK FIELD LVDV-1 Prime viscosity detector at room temperature (spindle# 2, 60 rpm);
[4]Tg of aqueous dispersions were measured by DSC.

Coating Compositions (Comp Coatings 1-5 and Coatings 1-10)

The coating compositions of Comp Coatings 1-5 and Coatings 1-10 were prepared through a two-stage process. Firstly, all ingredients in the grind stage, consisting of water (39.3 g), propylene glycol (22.6 g), TAMOL 681 (11.3 g), Tego Foamex 825 (1.1 g), Ti-Pure R-706 (237.7 g), and water (8.4 g) were added sequentially and mixed using a high speed disperser at 1,000 revolutions per minute (rpm) for 30 minutes to get a well dispersed slurry. Then ingredients in the letdown stage consisting of a binder (610.0 g), Tego Foamex 825 (1.7 g), AMP-95 (95%, 2.0 g), Texanol (14.8 g), ACRYSOL RM-12W (0.6 g), ACRYSOL RM-8W (1.0 g), water (46.4 g), and 15% NaNO$_2$ (13.0 g) were added sequentially into the slurry. Types of binders (i.e., the as prepared aqueous dispersions) used for each coating composition are given in Table 2. The obtained coating compositions each had a PVC of 17.24%, volume solids of 42.33% and weight solids of 53.69%. The obtained coating compositions were evaluated for water resistance and salt spray resistance properties according to the test methods described above and results are given in Table 2.

As shown in Table 2, the binders prepared in the absence of PEM and PDMS (Comp Ex 1), or in the absence of PEM (Comp Ex 3) both provided coatings with poor rust resistance performance with scores of 2-3 in the water resistance test and IS in the salt spray resistance test (Comp Coatings 1 and 3). The binder of Comp Ex 2 comprising the emulsion polymer having structural units of PEM but free of PDMS provided coatings with poor blister resistance in the water resistance test with a score of only 2. In contrast, all the binders of Exs 1-10 comprising emulsion polymers prepared in the presence of a specific amount of PEM and PDMS provided coatings with improved water resistance and salt spray resistance properties. It's believed that there is synergy between PDMS and PEM on water resistance and salt spray resistance improvement.

TABLE 2

Water resistance and anti-corrosion (salt spray resistance) properties

| Coating Composition | Binder (aqueous dispersion) | Water Resistance | | Salt Spray Resistance | |
|---|---|---|---|---|---|
| | | Blister | Rust | Blister | Rust |
| Comp Coating 1 | Comp Ex 1 | 7 | 3 | 6D | 1S |
| Comp Coating 2 | Comp Ex 2 | 2 | 7 | 6M | 5G |
| Comp Coating 3 | Comp Ex 3 | 7 | 2 | 6D | 1S |
| Comp Coating 4 | Comp Ex 4 | 2 | 3 | 6D | 0S |
| Comp Coating 5 | Comp Ex 5 | 1 | 6 | 6F | 7G |
| Coating 1 | Ex 1 | 7 | 9 | 8F | 9P |
| Coating 2 | Ex 2 | 8 | 9 | 10F | 9P |
| Coating 3 | Ex 3 | 6 | 7 | 6F | 8P |
| Coating 4 | Ex 4 | 7 | 8 | 6M | 7P |
| Coating 5 | Ex 5 | 8 | 9 | 8F | 9P |
| Coating 6 | Ex 6 | 8 | 9 | 10F | 9P |
| Coating 7 | Ex 7 | 7 | 9 | 9F | 9P |
| Coating 8 | Ex 8 | 7 | 9 | 9F | 9P |
| Coating 9 | Ex 9 | 5 | 9 | 8F | 8P |
| Coating 10 | Ex 10 | 6 | 9 | 8F | 8P |

Coating Compositions (Comp Coatings 6-10 and Coatings 11-20)

The coating compositions of Comp Coatings 6-10 and Coatings 11-20 were prepared according to the same procedure as preparing Coating 1 above. Firstly, all ingredients in the grind stage, consisting of water (180.0 g), Natrosol 250 HBR (1.0 g), Nopco NXZ (2.0 g), OROTAN CA-2500 (13.0 g), AMP-95 (95%, 1.0 g), Ti-Pure R-706 (230.0 g), and CC-1500 (95.0 g) were added sequentially and mixed using a high speed disperser at 1,000 revolutions per minute (rpm) for 30 minutes to get a well dispersed slurry. Then ingredients in the letdown stage consisting of a binder (330.0 g), propylene glycol (15.0 g), Texanol (8.0 g), ROPAQUE Ultra E (50.0 g), Nopco NXZ (1.0 g), ACRYSOL RM-8W (1.5 g), ACRYSOL RM-2020 NPR (1.0 g), and water (71.5 g) were added sequentially into the slurry. Types of the binders (i.e., the as prepared aqueous dispersions) used for preparing each coating composition are given in Table 4. The obtained coating compositions each had a PVC of 45.96%, volume solids of 34.50% and weight solids of 49.97%. The obtained coating compositions were evaluated for beading properties according to the test method described above and results are given in Table 3.

As shown in Table 3, Comp Coatings 6 and 7 both provided a beading score of 0, indicating no beading effect. Comp Coatings 8-10 all provided poor water repellency properties with beading scores of 2. In contrast, Coatings 11-20 of the present invention provided obviously improvement on water repellency performance as indicated by beading scores of 3 or higher, indicating good beading effect.

TABLE 3

Water repellency properties

| Coating Composition | Binder (aqueous dispersion) | PDMS* (%) | PEM* (%) | Beading score |
|---|---|---|---|---|
| Comp Coating 6 | Comp Ex 1 | 0 | 0 | 0 |
| Comp Coating 7 | Comp Ex 2 | 0 | 1.4 | 0 |
| Comp Coating 8 | Comp Ex 3 | 5.0 | 0 | 2 |
| Comp Coating 9 | Comp Ex 4 | 5.0 | 0.15 | 2 |
| Comp Coating 10 | Comp Ex 5 | 5.0 | 1.9 | 2 |
| Coating 11 | Ex 1 | 5.0 | 1.4 | 4 |
| Coating 12 | Ex 2 | 5.0 | 1.4 | 4 |
| Coating 13 | Ex 3 | 0.5 | 1.4 | 3 |

TABLE 3-continued

Water repellency properties

| Coating Composition | Binder (aqueous dispersion) | PDMS* (%) | PEM* (%) | Beading score |
|---|---|---|---|---|
| Coating 14 | Ex 4 | 1.0 | 1.4 | 4 |
| Coating 15 | Ex 5 | 2.5 | 1.4 | 4 |
| Coating 16 | Ex 6 | 1.5 | 1.4 | 4 |
| Coating 17 | Ex 7 | 8.0 | 1.4 | 4 |
| Coating 18 | Ex 8 | 10.0 | 1.4 | 4 |
| Coating 19 | Ex 9 | 5.0 | 0.6 | 3 |
| Coating 20 | Ex 10 | 5.0 | 1.6 | 3 |

*by weight based on the weight of the emulsion polymer.

Comp Coating Composition 21

To the above coating composition of Comp Coating 2, was added PDMS-1 in an amount of 5% by weight based on the binder (Comp Ex 2) solids in the coating composition of Comp Coating 2. The obtained coating composition was stored overnight and then drawn down on a Leneta white and black chart with a wet film thickness of 100 μm. The resulting coating film immediately showed severe contraction cavities and were not qualified for further performance evaluation. In contrast, all coating compositions of Coatings 1-20 were visually homogenous and stable. The coating films made from these coating compositions showed good appearance and no cavities observed on the surface of the coating films.

What is claimed is:

1. An aqueous dispersion of polymeric particles in an aqueous medium wherein the polymeric particles comprise an emulsion polymer and have a hydroxyl-terminated polysiloxane with the polymeric particles,
   wherein the emulsion polymer comprises, by weight based on the weight of the emulsion polymer, more than 0.5% to 1.8% of structural units of a phosphoalkyl (meth)acrylate, a salt thereof, or mixtures thereof; and from zero to 5.0% of structural units of an ethylenically unsaturated functional monomer carrying at least one functional group selected from an amide, carboxyl, carboxylic anhydride, sulfonic acid, sulfonate, sulfuric acid, or sulfate group;
   wherein the hydroxyl-terminated polysiloxane with the polymeric particles is present in an amount of from 0.1% to 10%, by weight based on the weight of the emulsion polymer.

2. The aqueous dispersion of claim 1, wherein the phosphoalkyl(meth)acrylate is selected from the group consisting of phosphoethyl (meth)acrylate, phosphopropyl (meth)acrylate, phosphobutyl (meth)acrylate, and mixtures thereof.

3. The aqueous dispersion of claim 1, wherein the emulsion polymer comprises, by weight based on the weight of the emulsion polymer, from 0.6% to 1.6% of structural units of the phosphoalkyl(meth)acrylate, the salt thereof, or mixtures thereof.

4. The aqueous dispersion of claim 1, wherein the hydroxyl-terminated polysiloxane has a weight average molecular weight of from 400 to 1,000,000 g/mol.

5. The aqueous dispersion of claim 1, wherein the hydroxyl-terminated polysiloxane is hydroxyl-terminated polydimethylsiloxane.

6. The aqueous dispersion of claim 1, wherein the polymeric particles have a particle size of from 50 to 500 nm.

7. The aqueous dispersion of claim 1, wherein the polymeric particles are formed by emulsion polymerization in the aqueous medium in the presence of the hydroxyl-terminated polysiloxane.

8. The aqueous dispersion of claim 1, wherein the emulsion polymer comprises, by weight based on the weight of the emulsion polymer, from 0.1% to 3% of structural units of the ethylenically unsaturated functional monomer.

9. The aqueous dispersion of claim 1, wherein the aqueous medium of the aqueous dispersion comprises less than 5% of the hydroxyl-terminated polysiloxane, by weight based on the total weight of the hydroxyl-terminated polysiloxane in the aqueous dispersion.

10. The aqueous dispersion of claim 1, wherein the hydroxyl-terminated polysiloxane with the polymeric particles is present in an amount of from 0.5% to 10%, by weight based on the weight of the emulsion polymer.

11. A process of preparing the aqueous dispersion of polymeric particles of claim 1, comprising:
    polymerization of monomers in an aqueous medium in the presence of a hydroxyl-terminated polysiloxane to obtain the aqueous dispersion of polymeric particles,
    wherein the monomers comprise, by weight based on the total weight of the monomers,
    more than 0.5% to 1.8% of a phosphoalkyl(meth)acrylate, a salt thereof, or mixtures thereof; and from zero to 5.0% of an ethylenically unsaturated functional monomer carrying at least one functional group selected from an amide, carboxyl, carboxylic anhydride, sulfonic acid, sulfonate, sulfuric acid, or sulfate group; and
    wherein the hydroxyl-terminated polysiloxane with the polymeric particles is present in an amount of from 0.1% to 10%, by weight based on the weight of the emulsion polymer.

12. An aqueous coating composition, comprising the aqueous dispersion of polymeric particles of claim 1.

13. The coating composition of claim 12 wherein the coating formed by the composition has
    a water repellency beading score of 3 or more,
    a water resistance blister rating of 5 or more and a water resistance rust rating of 6 or more, and/or
    a salt spray resistance blister rating of 6M or better and a salt spray rust rating of 7P or better.

14. The aqueous dispersion of claim 1, wherein the emulsion polymer comprises, by weight based on the weight of the emulsion polymer, from 0.1% to 5% of structural units of the ethylenically unsaturated functional monomer.

15. The aqueous dispersion of claim 1, wherein the emulsion polymer further comprises structural units of a monoethylenically unsaturated nonionic monomer.

16. The aqueous dispersion of claim 15 wherein the monoethylenically unsaturated nonionic monomer comprises butyl acrylate, styrene, or both.

17. The aqueous dispersion of claim 1 wherein hydroxyl-terminated polysiloxane has the structure represented by formula (I),

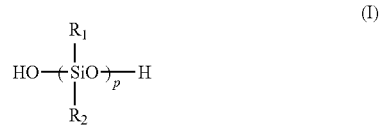

where p is an integer of from 2 to 100,000, and $R_1$ and $R_2$ are the same or different and are independently selected from the group consisting of an alkyl group having one to 18 carbon atoms, or an aryl group having 5 to 14 carbon atoms.

18. The aqueous dispersion of claim 1 wherein $R_1$ and $R_2$ are independently selected from methyl, ethyl, propyl or phenyl.

19. The aqueous dispersion of claim 1 wherein the emulsion polymer comprises, by weight based on the weight of the emulsion polymer, more than 0.5% to 1.4% of structural units of a phosphoalkyl(meth)acrylate, a salt thereof, or mixtures thereof.

20. The aqueous dispersion of claim 1 wherein the hydroxyl-terminated polysiloxane with the polymeric particles is present in an amount of from 0.1% to 2.5%, by weight based on the weight of the emulsion polymer.

* * * * *